May 12, 1925.
W. FRICK ET AL
RIM TOOL
Filed Sept. 25, 1923
1,537,342
2 Sheets-Sheet 1
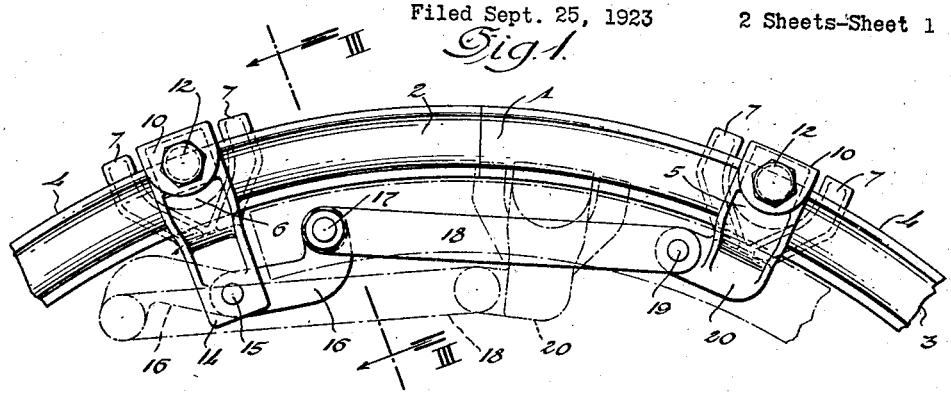
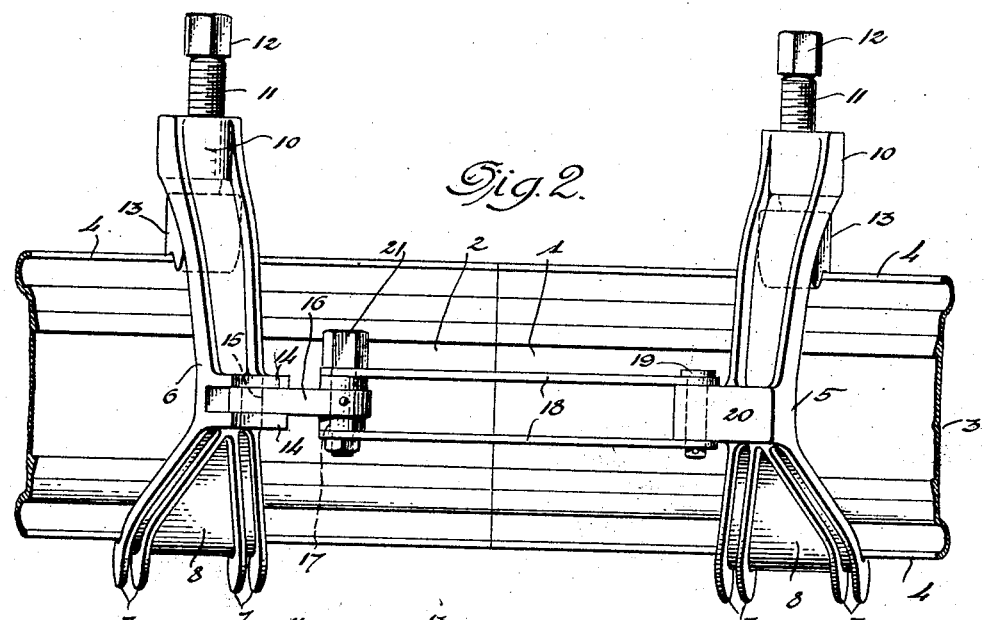
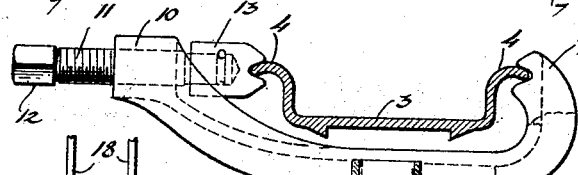
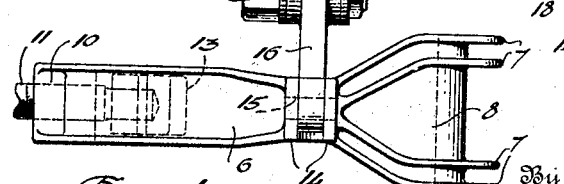
Inventors
William Frick
Frank Klima
By
Attorneys May 12, 1925.

W. FRICK ET AL 1,537,342

RIM TOOL

Filed Sept. 25, 1923  2 Sheets-Sheet 2

Inventors:
William Frick
Frank Klima
By
Attorneys

Patented May 12, 1925.

1,537,342

UNITED STATES PATENT OFFICE.

WILLIAM FRICK AND FRANK KLIMA, OF DETROIT, MICHIGAN.

RIM TOOL.

Application filed September 25, 1923. Serial No. 664,677.

*To all whom it may concern:*

Be it known that we, WILLIAM FRICK and FRANK KLIMA, citizens of the United States of America, residing at Detroit, in the county of Wayne and State of Michigan, have invented certain new and useful Improvements in Rim Tools, of which the following is a specification, reference being had therein to the accompanying drawings.

Our invention aims to provide a tool for retracting and distending a rim such as used on automobile wheels for supporting a tire. It is a well known fact that split rims are at times difficult to mount in a tire or be removed therefrom, and in order that such operations can be performed with facility and without injury to a tire rim, we have devised a device that can be easily and quickly clamped on a rim, adjacent its split ends, for shifting one end of the rim relative to the other end, either to retract the rim or distend it. By clamping the device on the split ends of the rim such ends can be easily controlled and the use of our device obviates the necessity of using any other tools or implements that would endanger a tire, particularly of the pneumatic type.

The construction entering into our invention will be hereinafter described and then claimed, and reference will now be had to the drawing, wherein Figure 1 is a side elevation of a portion of the tire rim with our device applied thereto, showing the device in position to swing one end of the rim to the position shown by dot and dash lines;

Fig. 2 is a plan of the device;

Fig. 3 is a cross sectional view taken on the line III—III of Fig. 1;

Fig. 4 is a plan of one of the gripping members of the device;

Figure 5:
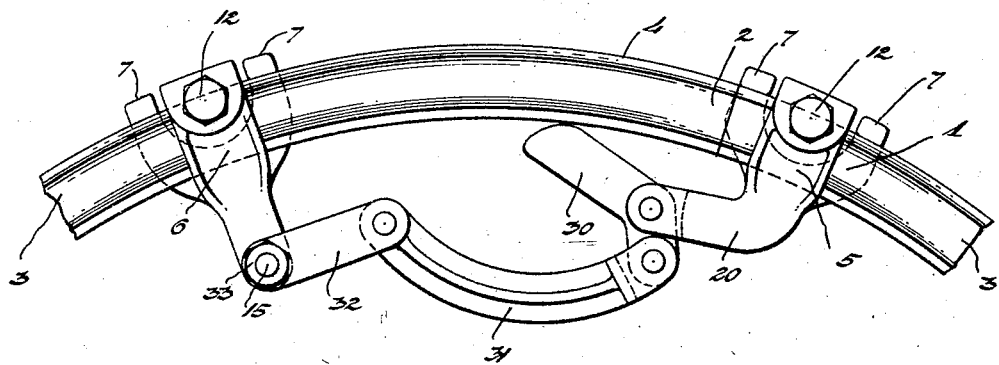
Fig. 5 is a side elevation of a portion of the tire rim with another form of our device applied thereto, showing the device in position to retract the rim.

In the drawing, the reference numerals 1 and 2 denote the split ends of a tire rim 3 adapted for supporting a tire either of the solid or pneumatic type. The rim 3 has outwardly turned side flanges 4 and said rim is of the demountable type adapted to be mounted on a wheel rim or supported by a carrier as an emergency "spare" rim. The confronting ends of the rim 3 may form a butt or scarf joint and in order that the rim may be mounted in a tire it is necessary that the split ends 1 and 2 be shifted relative to each other to either distend or retract the rim. For this purpose we use a tool or implement comprising stirrup shaped gripping members 5 and 6 which are substantially identical in construction. Considering the gripping member 6 it has one end terminating in sets of notched rim engaging jaws 7 connected by a web 8 which is cut away, as at 9, so as not to interfere with the jaws engaging one of the flanges of the rim, as best shown in Fig. 3.

The opposite end of the gripping member 6 terminates in a bearing 10 for a screw 11 having a nut head 12 at one end and a swiveled rim engaging head 13 at its opposite end. The rim engaging head 13 is notched to fit on one of the flanges 4 of the rim 3 and when engaging the flange the screw 11 may be adjusted to clamp the head 13 on the flange 4 so that said head may cooperate with the sets of rim engaging jaws 7 in positively holding the gripping member 6 relative to the split end 2 of the rim 3.

Intermediate the ends of the gripping member 6 is a set of outstanding lugs 14 and pivotally mounted between said lugs, by a pin 15 is an angular crank or actuating member 16 which has its outer end pivotally connected by a screw bolt or pivot pin 17 to a set of links 18. The links 18 are pivotally connected by a pin 19 to a single angular lug 20 carried by the gripping member 5 intermediate its ends, and this single angular lug 20 is adapted to project towards the gripping member 6 mounted on the split end 2 of the rim. With the lugs 20 and 14 articulated by the crank 16 and the links 18 the gripping members will have a defined relation when attached to the ends of a rim, and other than for the configuration of the lugs 20 and 14 the gripping members 5 and 6 are alike.

The pivot pin or screw bolt 17 which connects the crank 16 to the links 18 has a nut head 21 similar to the nut heads 12 of the screw 11, therefore the same socket wrench or tool employed for rotating the screws 11 to anchor the gripping members on the rim ends 1 and 2 can be used for engagement with the nut head 21 of the crank 16 to swing said crank on its pivot relative to the set of lugs 14.

Assuming that the gripping members have been placed in engagement with the rim 3, as shown in Fig. 1, the crank or actuating member 16 can be swung in an arc which first causes the split ends 1 and 2 of the rim to be separated and as the crank is further swung in an arc the rim end 1 is moved inwardly and pulled over the rim end 2, into overlapping relation, as shown by dot and dash lines in Fig. 1. This retracts the rim 3 to such an extent that it may be easily fitted in a tire or removed from a tire. In the latter instance it will be noted that the rim engaging jaws 7 and the rim engaging heads 13 engage the flanges 4 without pinching or injuring any tire that may be on the rim.

By again swinging the crank or actuating member 16 from its dash and dot line position to the full line position shown in Fig. 1, the rim may be distended and the split ends 1 and 2 placed in adjoining relation so that the rim 3 will be properly positioned relative to a tire for mounting on a wheel rim.

Figure 6:
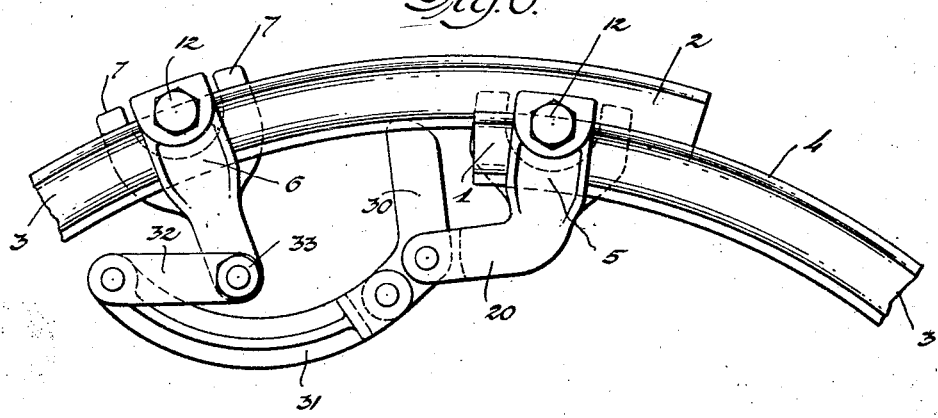
Fig. 6 is a similar view showing a rim retracted.
Figure 7:
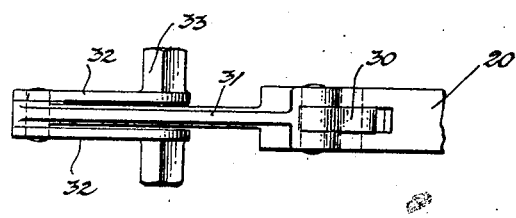
Fig. 7 is a plan of a portion of the device shown in Fig. 6.

Reference will now be had to Figs. 5 to 7 inclusive showing another form of our device, wherein the lug 20 of the gripping member 5 is provided with a pivoted fulcrum member 30 having its short arm pivotally connected by a curved link 31 to a set of cranks 32, said cranks being pivotally connected to the gripping member 6 with the pivot of said cranks provided with nut heads 33 so that a suitable wrench or tool may be employed for swinging said cranks.

As shown in Fig. 5 the fulcrum member 30 will be in position to engage the rim end 2 and raise the rim end 1 so that the rim 3 may be retracted, as shown in Fig. 6. The fulcrum member 30 will cause the rim end 1 to be pulled inwardly and then the fulcrum member will slide along the rim end 2 while the rim end 1 is pulled into an overlapping relation.

It is thought that the manner of operating our device will be apparent without further description, and while in the drawing there are illustrated the preferred embodiments of our invention, it is to be understood that the structural elements are susceptible to such variations and modifications as fall within the scope of the appended claim.

What we claim is:—

A rim adjusting device comprising gripping members, each gripping member having rim engaging jaws and adjustable engaging heads, the heads adapted to cooperate with the jaws in gripping the flanges of a rim contiguous to the split ends thereof, an angular lug carried by one of said gripping members and extending towards the other gripping member, a three part linkage between said gripping member composed of an actuating member pivotally connected to one of said gripping members and adapted to be swung in an arc relative thereto, a pivoted fulcrum member carried by the angular lug of the other gripping member and a curved link connecting said actuating member to a short arm of said fulcrum member so that said actuating member may shift the last mentioned gripping member and thereby move one split end of a rim relative to the other end of the rim.

In testimony whereof we affix our signatures in presence of two witnesses.

WILLIAM FRICK.
FRANK KLIMA.

Witnesses:
ANNA M. DORR,
KARL H. BUTLER.